United States Patent
Lim et al.

(10) Patent No.: US 7,815,715 B2
(45) Date of Patent: Oct. 19, 2010

(54) MOUNTING CONFIGURATION FOR A FILTRATION CANISTER

(75) Inventors: SiongLee Lim, Singapore (SG); CheeYin Chan, Singapore (SG)

(73) Assignee: Seagate Technology LLC, Scotts Valley, CA (US)

(*) Notice: Subject to any disclaimer, the term of this patent is extended or adjusted under 35 U.S.C. 154(b) by 1205 days.

(21) Appl. No.: 10/696,879

(22) Filed: Oct. 30, 2003

(65) Prior Publication Data

US 2005/0092178 A1     May 5, 2005

(51) Int. Cl.
  B01D 53/02    (2006.01)
  B01D 46/00    (2006.01)

(52) U.S. Cl. .................... 95/90; 95/273; 55/385.6; 360/97.02; 96/134

(58) Field of Classification Search ............ 55/385.6, 55/320, 486, 505, 386.4; 96/108, 147, 154, 96/135, 139, 134; 360/97.01, 97.02, 97.03; 95/273, 90
See application file for complete search history.

(56) References Cited

U.S. PATENT DOCUMENTS

| | | | |
|---|---|---|---|
| 4,863,499 A | 9/1989 | Osendorf | |
| 5,030,260 A | 7/1991 | Beck et al. | |
| 5,367,417 A * | 11/1994 | Brown et al. | 360/97.02 |
| 5,417,743 A * | 5/1995 | Dauber | 96/13 |
| 5,447,695 A * | 9/1995 | Brown et al. | 422/171 |
| 5,507,951 A * | 4/1996 | French et al. | 210/631 |
| 5,515,214 A * | 5/1996 | Kiyonaga et al. | 360/97.02 |
| 5,537,270 A * | 7/1996 | Morehouse et al. | 360/97.02 |
| 5,877,915 A | 3/1999 | Ishida | |
| 6,088,190 A | 7/2000 | Anderson | |
| 6,128,159 A | 10/2000 | Ino | |
| 6,214,070 B1 * | 4/2001 | Crowder et al. | 55/320 |
| 6,296,691 B1 * | 10/2001 | Gidumal | 96/17 |
| 6,475,270 B1 * | 11/2002 | Graeve | 96/135 |
| 6,529,345 B1 | 3/2003 | Butler et al. | |
| 6,712,887 B2 * | 3/2004 | Ueki et al. | 96/134 |
| 6,740,145 B2 * | 5/2004 | Boroson et al. | 96/108 |
| 6,824,595 B2 * | 11/2004 | Ueki et al. | 96/134 |

* cited by examiner

*Primary Examiner*—Duane Smith
*Assistant Examiner*—Minh-Chau Pham
(74) *Attorney, Agent, or Firm*—Leanne Taveggia Farrell; Westman, Champlin & Kelly, P.A.

(57) ABSTRACT

An enclosure system for a device includes an enclosure having an outer surface and an inner surface. The system includes an aperture that extends between the outer surface and the inner surface of the enclosure. The aperture has a larger cross-section adjacent the outer surface than adjacent the inner surface. A filter is positioned within the aperture.

8 Claims, 7 Drawing Sheets

MOUNTING CONFIGURATION FOR A FILTRATION CANISTER

FIELD OF THE INVENTION

The present invention relates generally to the field of data storage systems. More particularly, the present invention relates to mounting a filtration canister.

BACKGROUND OF THE INVENTION

Disc drives are common data storage systems. A typical disc drive includes a rigid housing or deck that encloses a variety of disc drive components. The components include one or more discs having data surfaces that are coated with a magnetizable medium for storage of digital information in a plurality of circular, concentric data tracks. The discs are mounted on a spindle motor that causes the discs to spin and the data surfaces of the discs to pass under respective aerodynamic bearing disc head sliders. The sliders carry transducers, which write information to and read information from the data surfaces of the discs.

Typically, each disc drive contains a filtration system to protect the discs from particle contamination as well as chemical contamination. For example, contaminants in the head disc interface can increase the likelihood of disc drive failure. The filtration system generally contains sub-systems such as a breather filter, a re-circulation filter, a carbon adsorber, diffusion path and combinations thereof. The breather filter is responsible for removing particles from air entering into the disc drive from the external environment. In current designs, a breather filter and carbon adsorbent are all designed into one canister. The canister is mounted to the internal surface of the enclosure of the disc drive adjacent a breather hole with an adhesive.

There exist inherent problems with mounting the canister to the enclosure in the above-described configuration. For example, the adhesive is exposed to the internal environment of the disc drive and can chemically contaminate the head disc interface causing catastrophic disc drive failure. The adhesive may also not be strong enough to properly secure the canister to the internal surface of the disc drive. In one example, humidity in the internal disc drive can accelerate adhesive deterioration. In another example, vibration and shock can aggravate a deteriorating adhesive.

In addition, manufacture and assembly of the canister is costly and inefficient. For example, the canister must be mounted to the enclosure of the disc drive with suitable accuracy in order for the breather hole of the canister to match the hole in the enclosure. Also, the canister must be mounted to the disc drive before it is completely assembled and sealed.

Embodiments of the present invention provide solutions to these and other problems and offer other advantages over the prior art.

SUMMARY OF THE INVENTION

In one embodiment, the present invention is directed towards an enclosure system for a device, which includes an enclosure having an outer surface and an inner surface. The system includes an aperture that extends between the outer surface and the inner surface of the enclosure. The aperture has a larger cross-section adjacent the outer surface than adjacent the inner surface. A filter is disposed within the aperture.

In another embodiment, the present invention is directed towards a method of removing contaminants from air entering an enclosed system. The method includes providing an enclosure having an inner surface and an outer surface and forming an aperture in the enclosure that extends from the outer surface to the inner surface. The aperture has a larger cross-section adjacent the outer surface than the cross-section adjacent the inner surface. The method also includes depositing a filter within the aperture to filter air entering the enclosure.

Other features and benefits that characterize embodiments, of the present invention will be apparent upon reading the following detailed description and review of the associated drawings.

BRIEF DESCRIPTION OF THE DRAWINGS

FIG. 6B is a section view of a portion of the disc drive as shown in FIG. 6A.

DETAILED DESCRIPTION OF ILLUSTRATIVE EMBODIMENTS

Figure 1:
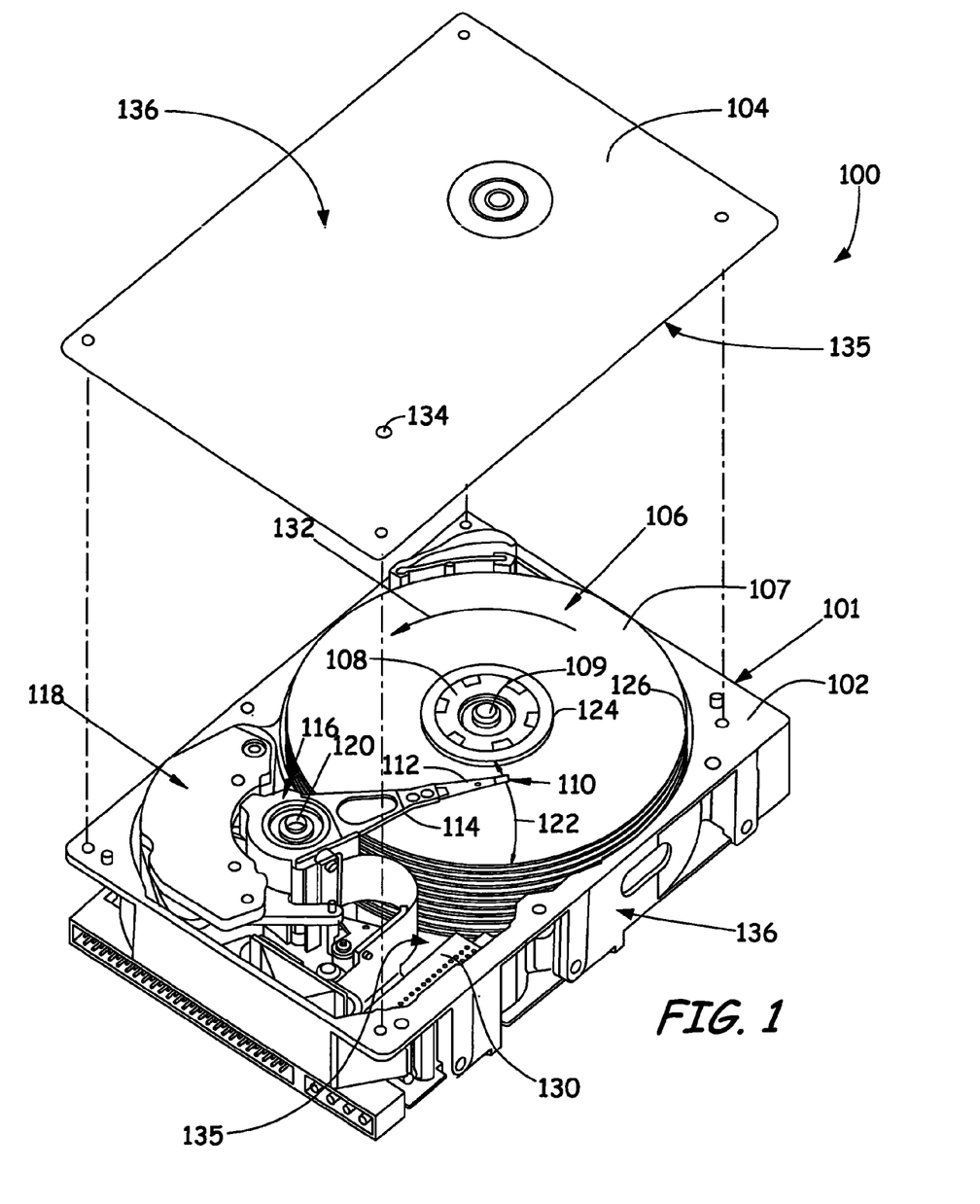
FIG. 1 is a perspective view of a disc drive.

FIG. 1 is a perspective view of a disc drive 100 in which embodiments of the present invention are useful. Disc drives are common data storage systems. Disc drive 100 includes an enclosure 101 having a basedeck 102 and a top cover 104. Enclosure 101 includes an inner surface 135 and an outer surface 136. Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110, which carries a read/write head for communication with the surface on each disc 107.

Each slider 110 is supported by a suspension 112 which is in turn attached to a track accessing arm 114 of an actuator mechanism 116. Actuator mechanism 116 is rotated about a shaft 120 by a voice coil motor 118, which is controlled by servo control circuitry within internal circuit 130. As voice coil motor 118 rotates actuator mechanism 116, slider 110 moves in an arcuate path 122 between a disc inner diameter 124 and a disc outer diameter 126.

During operation, as discs 107 rotate in a rotational direction 132, the discs 107 drag air under the respective sliders 110 and along their air bearing surfaces. As the air passes beneath the air bearing surfaces, air compression along the airflow path causes the air pressure between the discs 107 and the air bearing surfaces to increase, which creates an aerodynamic lifting force that counteracts the load force provided by actuator mechanism 116 and causes the sliders 110 to lift and fly above, but in close proximity to the disc surfaces. While FIG. 1 illustrates one manner of actuating a data head proximate a data storage medium, the present invention, however, is applicable to data storage systems that use other techniques.

Disc drive 100 is not a closed system. An exchange of air through a breather hole 134 equalizes pressure differentials between the internal air of disc drive 100 and the ambient air of the surroundings. This exchange of air may result in particle contamination as well as chemical contamination of disc drive 100. For example, contaminants in the head disc interface can increase the likelihood of disc drive failure. In general, a breather filter (not shown in FIG. 1) covers breather hole 134 and is responsible for removing contaminants from the external air entering disc drive 100.

Figure 2:
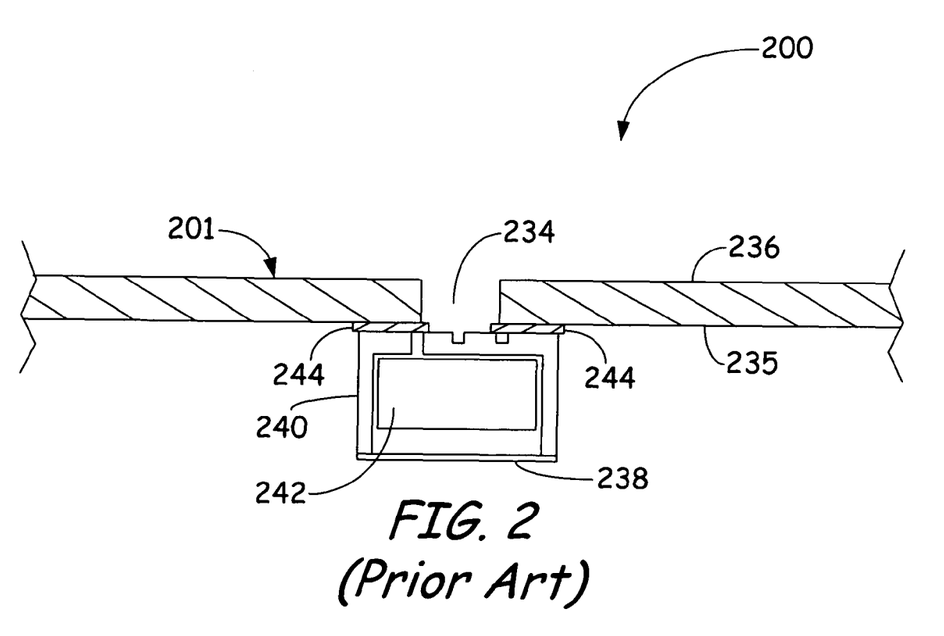
FIG. 2 is a section view of a prior art disc drive.

FIG. 2 is a section view of a prior art disc drive. As illustrated in FIG. 2, disc drive 200 has an enclosure 201 with inner surface 235 and outer surface 236. Enclosure 201 also has breather hole 234 with breather filter 238 to prevent particle contamination from entering the internal environment of disc drive 200. Breather filter 238 is designed into canister 240, which also includes carbon absorbent 242 for preventing chemical contamination. Canister 240 is mounted to inner surface 235 of enclosure 201 with an adhesive 244. However, this configuration of canister 240 has a multitude of inherent problems.

Adhesive 244 used to mount canister 240 to inner surface 235 is exposed to and contaminates the internal environment of disc drive 200 by outgassing. This chemical contamination can cause catastrophic disc drive failure. The adhesive may also be too weak to properly secure canister 240 to inner surface 235 of disc drive 200. For example, humidity, which enters disc drive 200 through breather hole 234, can accelerate adhesive deterioration as well as external vibration and shock. In addition, the manufacturing and assembly of canister 240 in the configuration illustrated in FIG. 2 is costly and inefficient. For example, canister 240 must be mounted to enclosure 201 with suitable accuracy in order for breather hole 234 to match the hole in canister 240. In addition, canister 240 must be mounted into disc drive 200 before enclosure 201 is fully sealed and assembled.

Figure 3A:
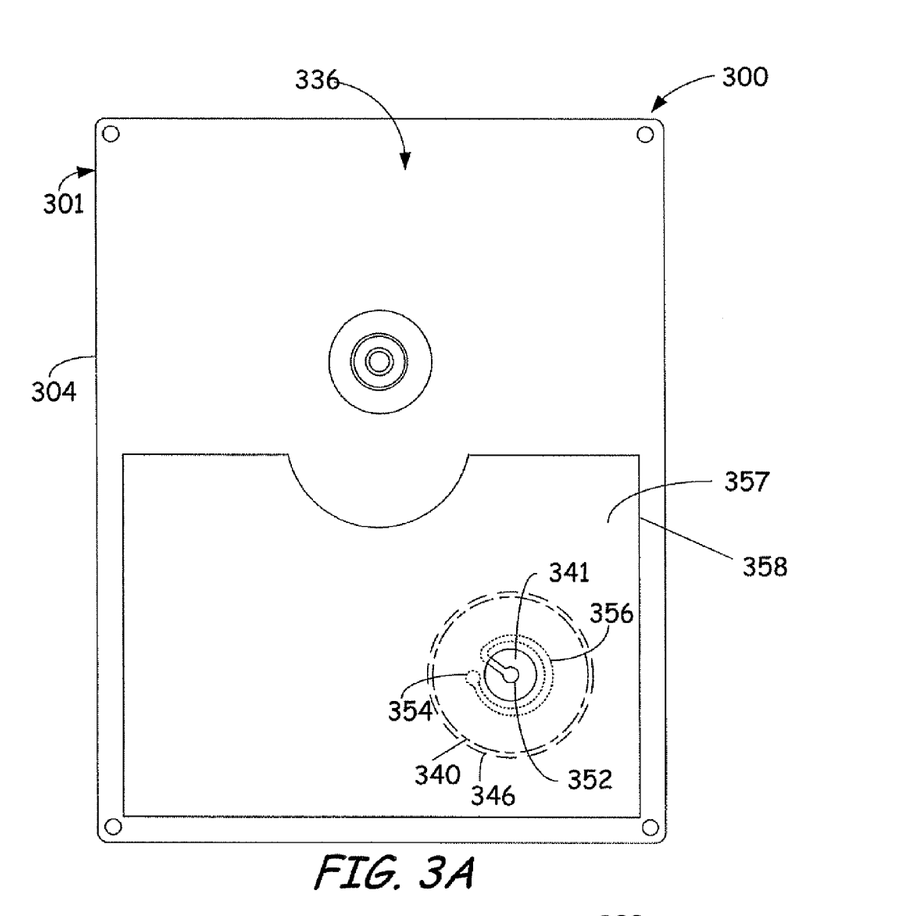
FIG. 3A is a top plan view of a disc drive in accordance with an embodiment of the present invention.
Figure 3B:
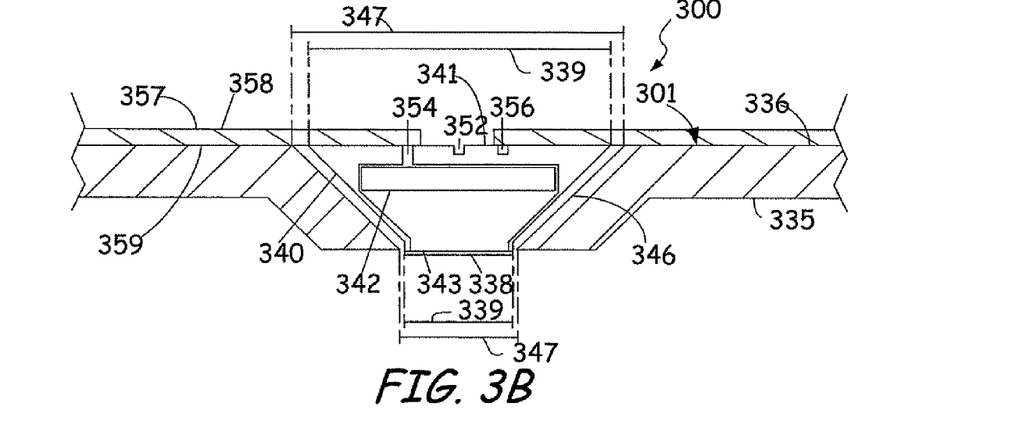
FIG. 3B is a section view of a portion of the disc drive as shown in FIG. 3A.

FIG. 3A is a top plan view of disc drive 300 in accordance with one embodiment of the present invention. FIG. 3B is a section view of a portion of disc drive 300 as shown in FIG. 3A. FIGS. 3A and 3B illustrate filtration canister 340 deposited within aperture 346. Aperture 346 extends between outer surface 336 and inner surface 335 of enclosure 301. It should be noted that although aperture 346 is shown extending through top cover 304 in FIGS. 3A and 3B, aperture 346 can extend through enclosure 301 in other locations of disc drive 300 from inner surface 335 to outer surface 336. Aperture 346 provides a housing for filtration canister 340 such that aperture 346 supports filtration canister 340 and prevents it from falling into disc drive 300 at inner surface 335. Aperture 346 has a larger cross-section adjacent outer surface 336 than the cross-section adjacent inner surface 335 and includes a diameter 347 that tapers from outer surface 336 to inner surface 335. As illustrated in the top plan view in FIG. 3A, aperture 346 is substantially circular. Those skilled in the art, however, should recognize that aperture 346 can be a variety of different shapes.

As shown in FIGS. 3A and 3B, filtration canister 340 has first end 341 adjacent outer surface 336 of disc drive 300 and second end 343 adjacent inner surface 335 of disc drive 300. First end 341 has an area that is larger than second end 343. As illustrated in FIGS. 3A and 3B, filtration canister 340 has a substantially circular first end 341 and a substantially circular second end 343 that coincides with the substantially circular aperture 346. As discussed above, those skilled in the art should recognize that first end 341 and second end 343 can have a variety of different shapes that are relative to the shape of aperture 346. Filtration canister 340 also includes a diameter 339 that tapers from first end 341 to second end 343.

Filtration canister 340 includes channel 356 that extends from an inlet 352 to an outlet 354. External air enters inlet 352 and passes through channel 356 to outlet 354. Channel 356 is a tortuous passageway having walls that are substantially perpendicular to the top surface of canister 340. Channel 356 delays diffusion entry of molecules (usually moisture) to canister 340. Filtration canister 340 also includes feature 342. Feature 342 is a carbon absorbent for absorbing chemical contamination. In the alternative, feature 342 can be a desiccant for absorbing moisture. Canister 340 also includes a breather filter 338. Breather filter 338 is a filter element that collects and filters particles in the air entering the internal environment of disc drive 300.

Disc drive 300 also includes label 358 having first surface 357 and second surface 359. First surface 357 includes markings for identifying disc drive 300 and second surface 359 includes an adhesive to adhere label 358 to outer surface 336 of enclosure 301 and a portion of first end 341 of filtration canister 340. Label 358 prevents filtration canister 340 from falling out of aperture 346 at outer surface 336. Unlike prior art disc drive 200, the adhesive in the above configuration does not outgas to the internal environment of disc drive 300. In addition, since the adhesive is applied to outer surface 336, the adhesive will not deteriorate from humidity that is within disc drive 300.

Figure 4A:
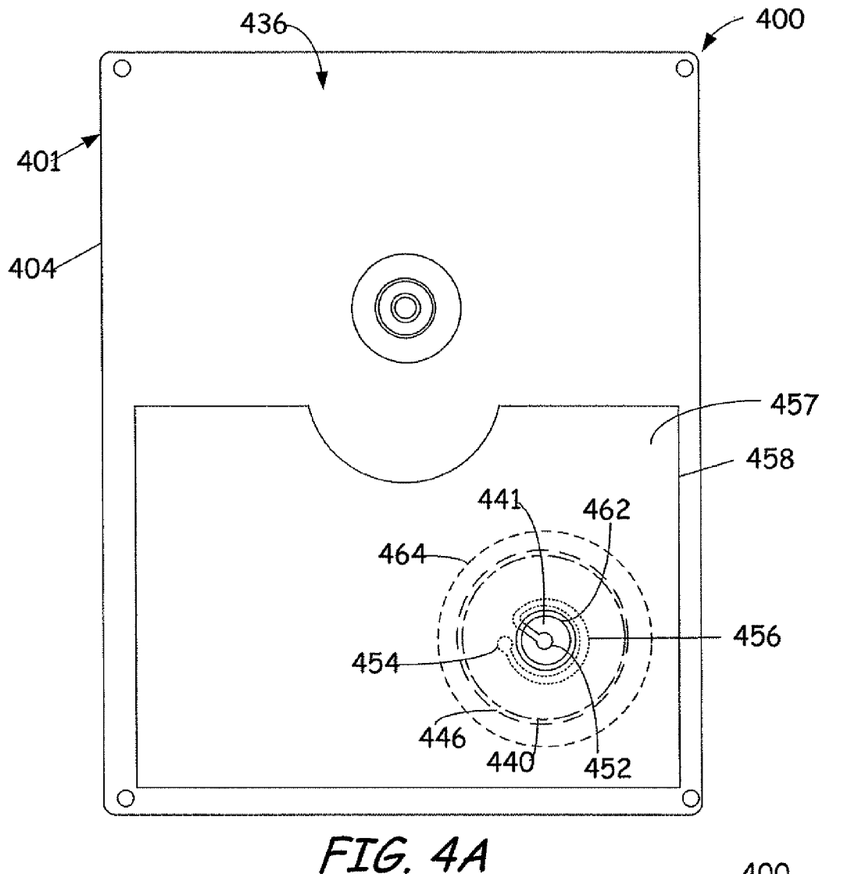
FIG. 4A is a top plan view of a disc drive in accordance with another embodiment of the present invention.
Figure 4B:
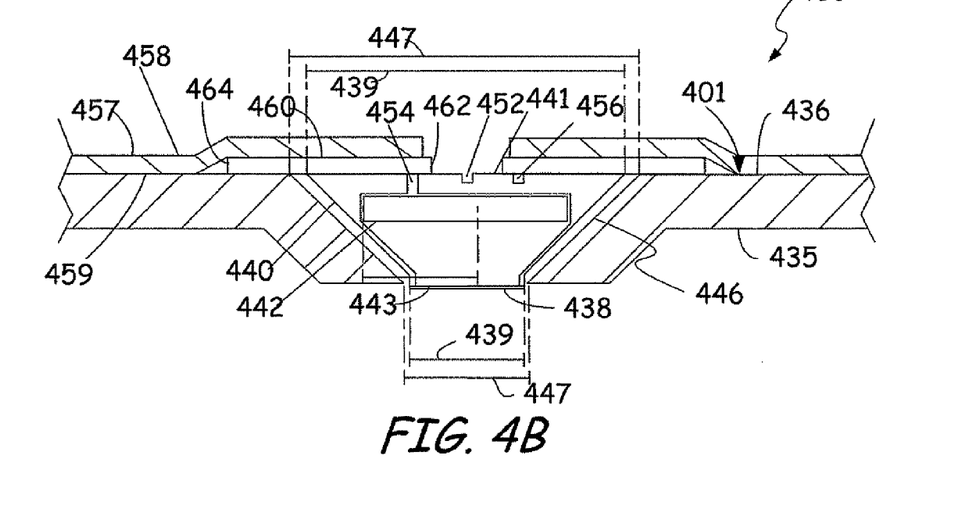
FIG. 4B is a section view of a portion of the disc drive as shown in FIG. 4A.

FIG. 4A is a top plan view of disc drive 400 in accordance with another embodiment of the present invention. FIG. 4B is a section view of a portion of disc drive 400 as shown in FIG. 4A. FIGS. 4A and 4B illustrate filtration canister 440 deposited within aperture 446. Aperture 446 extends between outer surface 436 and inner surface 435 of enclosure 401. It should be noted that although aperture 446 is shown extending through top cover 404 in FIGS. 4A and 4B, aperture 446 can extend through enclosure 401 in other locations of disc drive 400 from inner surface 435 to outer surface 436.

As described above in FIGS. 4A and 4B, aperture 446 has a larger cross-section adjacent outer surface 436 than the cross-section adjacent inner surface 435 and includes a diameter 447 that tapers from outer surface 436 to inner surface 435. Aperture 446 can have various shapes as long as the geometry of aperture 446 provides a housing for filtration canister 440 such that aperture 446 supports filtration canister 440 and prevents it from falling into disc drive 400 at inner surface 435. In addition, filtration canister 440 has first end 441 adjacent outer surface 436 and second end 443 adjacent inner surface 435. Both first end 441 and second end 443 have various shapes that are relative to the shape of aperture 446. Filtration canister 440 also includes a diameter 439 that tapers from first end 441 to second end 443.

Seal 460 is mounted to outer surface 436 of enclosure 401 and a portion of first end 441 of filtration canister 440. Seal 460 has an inner diameter 462 and an outer diameter 464 such that seal 460 includes an opening for inlet 452. Seal 460 seals filtration canister 440 to outer surface 436 of enclosure 401 such that air entering the internal environment of disc drive 400 can only enter through inlet 452. For example, seal 460 can be made of aluminum or other type of material having similar properties. Disc drive 400 also includes label 458 having a first surface 457 which includes markings for identifying disc drive 400. Label 458 also has second surface 459 which includes an adhesive to adhere label 458 to seal 460 and outer surface 436. Seal 460 prevents filtration canister 440 from falling out of aperture 446 at outer surface 436. This seal 460 and label 458 configuration prevents outgassing of adhesive to the internal environment of disc drive 400. In addition, since the adhesive is applied to the outer surface 436, the adhesive will not deteriorate from humidity that is within disc drive 400.

Figure 5A:
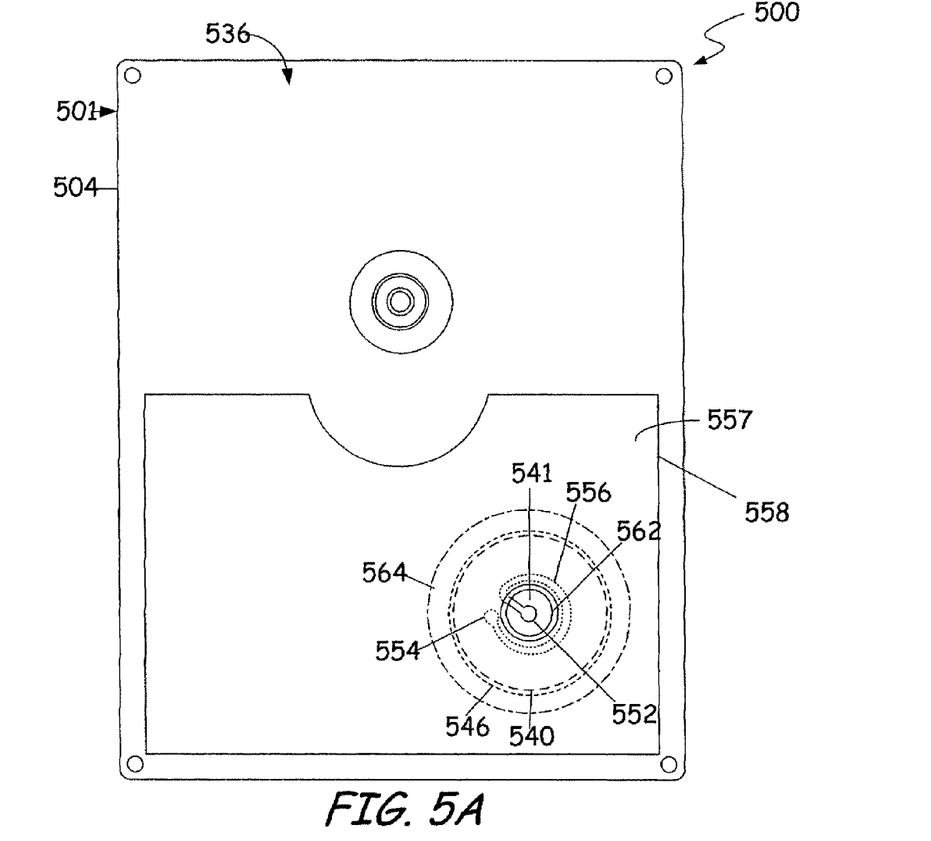
FIG. 5A is a top plan view of a disc drive in accordance with another embodiment of the present invention.
Figure 5B:
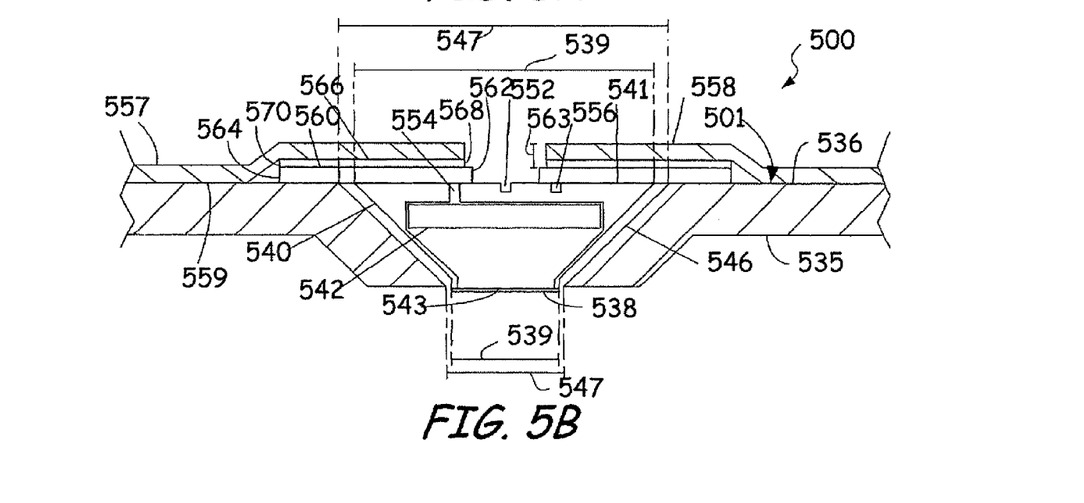
FIG. 5B is a section view of a portion of the disc drive as shown in FIG. 5A.

FIG. 5A is a top plan view of disc drive 500 in accordance with yet another embodiment of the present invention. FIG. 5B is a section view of a portion of disc drive 500 as shown in FIG. 5A. FIGS. 5A and 5B illustrate filtration canister 540 deposited within aperture 546. Aperture 546 extends between outer surface 536 and inner surface 535 of enclosure 501. It should be noted that although aperture 546 is shown extending through top cover 504 in FIGS. 5A and 5B, aperture 546 can extend through enclosure 501 in other locations of disc drive 500 from inner surface 535 to outer surface 536.

As described above in previous embodiments, aperture 546 has a larger cross-section adjacent outer surface 536 than the cross-section adjacent inner surface 535 and includes a diameter 547 that tapers from outer surface 536 to inner surface 535. Aperture 546 can have various shapes as long as the geometry of aperture 546 provides a housing for filtration canister 540 such that aperture 546 supports filtration canister 540 and prevents it from falling into disc drive 500 at inner surface 535. In addition, filtration canister 540 includes first end 541 adjacent outer surface 536 and second end 543 adjacent inner surface 535. Both first end 541 and second end 543 have various shapes that are relative to the shape of aperture 546. Filtration canister 540 also includes a diameter 539 that tapers from first end 541 to second end 543.

Seal 560 is mounted to outer surface 536 of enclosure 501 and a portion of first end 541 of filtration canister 540. Seal 560 has an inner diameter 562 and outer diameter 564 such that seal 560 includes an opening for inlet 552. Seal 560 seals filtration canister 540 to outer surface 536 of enclosure 501 such that air entering the internal environment of disc drive 500 can only enter through inlet 552. For example, seal 560 can be made of aluminum or other type of material with similar properties. Label layer 563 includes liner 566 and label 558 removably deposited on liner 566. Liner 566 has an inner diameter 568 and an outer diameter 570 such that liner 566 includes an opening for inlet 552. Label 558 has a first surface 557, which includes markings for identifying the disc drive and a second surface 559 which includes an adhesive to adhere label 558 to outer surface 536. Liner 566 serves as a barrier between label 558 and seal 560 such that label 558 can not adhere to seal 560. Therefore, label 558 can be removed without additionally removing seal 560. Seal 560 prevents filtration canister 540 from falling out of aperture 546 at outer surface 536. This seal 560 and label layer 563 configuration prevents outgassing of adhesive to the internal environment of disc drive 500. In addition, since the adhesive is applied to the outer surface 536, the adhesive will not deteriorate from humidity that is in disc drive 500.

Figure 6A:
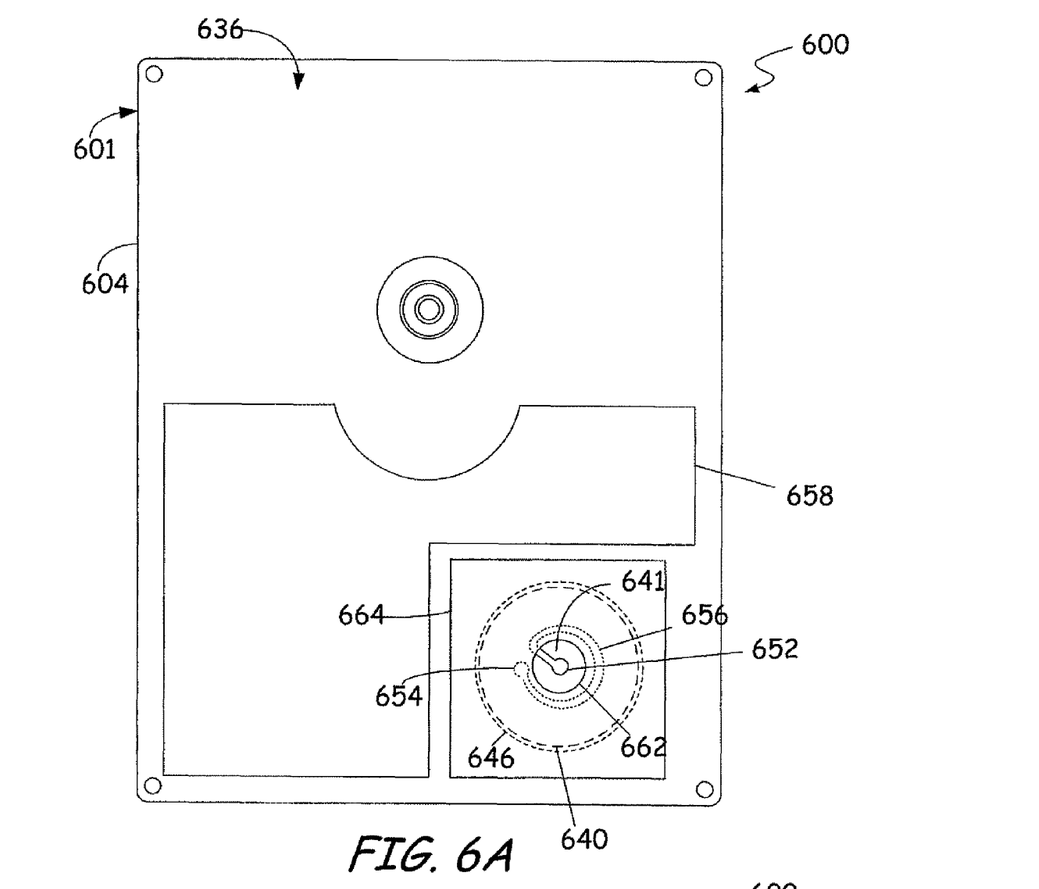
FIG. 6A is a top plan view of a disc drive in accordance with another embodiment of the present invention.

FIG. 6A is a top plan view of disc drive 600 in accordance with yet another embodiment of the present invention. FIG. 6B is a section view of a portion of disc drive 600 as shown in FIG. 6A. FIGS. 6A and 6B illustrate filtration canister 640 disposed within aperture 646. Aperture 646 extends between outer surface 636 and inner surface 635 of enclosure 601. It should be noted that although aperture 646 is shown extending through top cover 604 in FIGS. 6A and 6B, aperture 646 can extend through enclosure 601 in other locations of disc drive 600 from inner surface 635 to outer surface 636.

As described in previous embodiments, aperture 646 has a larger cross-section adjacent outer surface 636 than the cross-section adjacent inner surface 635 and includes a diameter 647 that tapers from outer surface 636 to inner surface 635. Aperture 646 can have various shapes as long as the geometry of aperture 646 provides a housing for filtration canister 640 such that aperture 646 supports filtration canister 640 and prevents it from falling into disc drive 600 at inner surface 635. In addition, filtration canister 640 includes first end 641 adjacent outer surface 636 and second end 643 adjacent inner surface 635. Both first end 641 and second end 643 have various shapes that are relative to the shape of aperture 646. Filtration canister 640 also includes a diameter 639 that tapers from first end 641 to second end 643.

In yet another aspect of the present invention, label 658 is truncated as shown in FIG. 6A such that label 658 does not adhere to first end 641 of filtration canister 640. In the alternative, seal 660 is adhered to outer surface 636 of enclosure 601 and first end 641 of filtration canister 640 to prevent filtration canister 640 from falling out of aperture 646 at outer surface 636. Seal 660 has an inner diameter 662 and outer diameter 664 such that seal 660 includes an opening for inlet 652. Along with preventing filtration canister 640 from falling out of aperture 646, seal 660 seals filtration canister 640 to outer surface 636 of enclosure 601 such that air entering the internal environment of disc drive 600 can only enter through inlet 652. For example seal 660 can be made of aluminum or other type of material with similar properties. This seal 660 configuration prevents outgassing of adhesive to the internal environment of disc drive 600. In addition, since seal 660 is mounted to outer surface 636, the adhesive used to mount seal 660 will not deteriorate from humidity that is in the disc drive 600.

Figure 7:
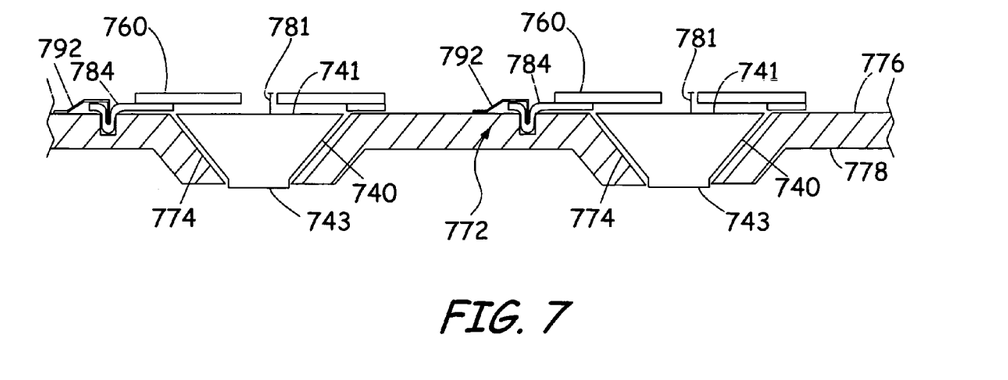
FIG. 7 is a section view of a tray in accordance with an embodiment of the present invention.

FIG. 7 illustrates a section view of tray 772 used in transferring a filtration canister from a supplier to a disc drive for assembly. Tray 772 includes a plurality of apertures 774 which house a plurality of filtration canisters 740. FIG. 7 illustrates a section view of two such apertures 774 and their corresponding filtration canisters. The plurality of apertures 774 extend between first surface 776 and second surface 778 of tray 772. After filtration canister 740 is manufactured, the plurality of filtration canisters are deposited within the plurality of apertures 774 and shipped to the location where disc drives are assembled.

Upon disc drive assembly, the plurality of filtration canisters 740 are removed from their corresponding apertures 774 in tray 772 and placed into a disc drive. To simplify the picking and placing of the plurality of filtration canisters 740, each filtration canister 740 has a corresponding seal layer 781 that is mounted to outer surface 776 of tray 772 and a portion of first end 741 of each filtration canister 740. Seal layer 781 includes liner 784 and seal 760 removably deposited on liner 784.

Figure 8:
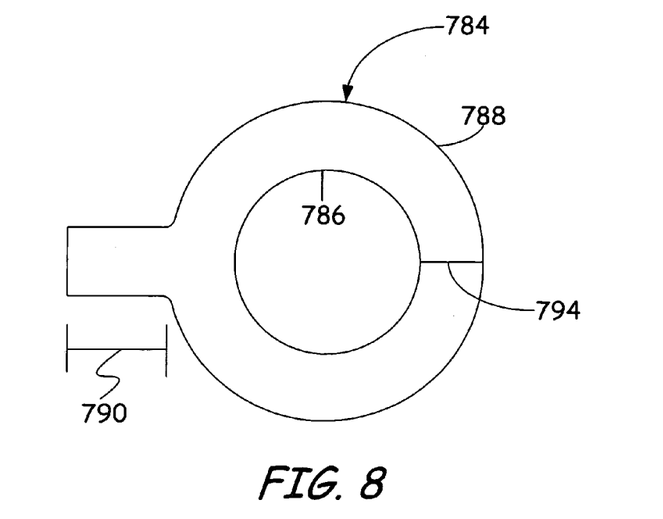
FIG. 8 is a top plan view of the liner as shown in FIG. 7.

FIG. 8 is a top plan view of a single liner 784 corresponding to one of the filtration canisters 740 of FIG. 7. Liner 784 has an inner diameter 786 and an outer diameter 788. In FIG. 7, seal layer 781 is positioned on first surface 776 of tray 772 such that inner diameter 786 of liner 784 is adjacent aperture 740. Liner 784 includes a fastening section 790 and a slit 794. Fastening section 790 provides an area for fastener 792 to hold liner 784 on tray 772. Slit 794 is a cut in liner 784. Seal 760, in FIG. 7, is removably deposited on liner 784 and a portion of first end 741 of one of the filtration canisters 740. Slit 794 allows liner 784 to open up in order to ease its detachment from seal 760 and filtration canister 740 when seal 760 and filtration canister 740 are removed from tray 772. Liner 784 prevents seal 760 from adhering to tray 772 such that seal 760 may easily adhere to the outer surface of a disc drive upon transfer and placement.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a filtration canister for a data storage system, it will be appreciated by those skilled in the art that the teachings of the present invention can be applied to other enclosure systems for enclosing mechanical devices, without departing from the scope and spirit of the present invention.

What is claimed is:

1. A method of removing contaminants from air entering a data storage system, the method comprising:
    providing an enclosure configured to house components of the data storage system, the enclosure having a inner surface and an outer surface;
    forming an aperture in the enclosure that extends from the outer surface to the inner surface, the aperture having a larger cross-section adjacent the outer surface than the cross-section adjacent the inner surface and having a diameter that continuously tapers from the outer surface to the inner surface of the enclosure; and
    depositing a filter within the aperture to filter air entering the enclosure through the aperture, wherein depositing the filter comprises:
        transferring the filter from a supplier to an assembler in a tray;
        removing the filter from the tray;
        placing the filter into the aperture of the enclosed system
        mounting a seal layer to the outer surface of the tray and a portion of the filter, wherein the seal layer includes a liner and a seal; and
        fastening the liner to the tray with a fastener to prevent the seal from adhering to the tray when the filter is removed from the tray.

2. The method of claim 1, wherein depositing the filter within the aperture comprises depositing a carbon absorbent within the aperture to absorb chemical contamination entering the enclosed system.

3. The method of claim 1, wherein depositing the filter within the aperture comprises depositing a desiccant within the aperture to dehumidify the air entering the enclosed system.

4. The method of claim 1 and further comprising adhering a label to the outer surface of the enclosure, the label having markings on a first surface and having adhesive on a second surface of the label.

5. The method of claim 1 and further comprising:
    mounting a seal to the outer surface of the enclosure and a portion of the filter; and
    adhering a label to the outer surface of the enclosure and the seal, wherein the label has markings on a first surface and adhesive on a second surface.

6. The method of claim 1 and further comprising:
    mounting a seal to the outer surface of the enclosure and a portion of the filter; and
    adhering a label layer to the outer surface of the enclosure and the seal, wherein the label layer includes a label removably deposited on a liner.

7. The method of claim 1 and further comprising mounting a seal to the outer surface of the enclosure and a portion of the filter.

8. The method of claim 1, wherein mounting the liner further comprises providing a slit in the liner to ease detachment of the liner from the seal and the filter.

* * * * *